United States Patent [19]
Haraway, Jr. et al.

[11] 3,898,730

[45] Aug. 12, 1975

[54] BONDING METHOD IN THE MANUFACTURE OF CONTINUOUS REGRESSION RATE SENSOR DEVICES

[75] Inventors: William H. Haraway, Jr.; Walter J. Dale; Edwin A. McErlean, all of Hampton, Va.

[73] Assignee: The United States of America as represented by the United States National and Space Administration Office of General Counsel-Code GP, Washington, D.C.

[22] Filed: Dec. 12, 1973

[21] Appl. No.: 424,038

[52] U.S. Cl. ..................... 29/613; 29/610; 338/13; 338/283
[51] Int. Cl. .............................................. H01c 1/02
[58] Field of Search ...................... 338/13, 25–26, 338/195, 283, 284, 294, 254–256; 29/610, 613; 161/257, 227, 182; 156/335; 73/344

[56] References Cited
UNITED STATES PATENTS
3,512,413  5/1970  Krusenstierna et al. .............. 73/344

*Primary Examiner*—C. L. Albritton
*Attorney, Agent, or Firm*—Howard J. Osborn; Wallace J. Nelson; John R. Manning

[57] ABSTRACT

In a method for manufacturing continuous regression rate sensor devices wherein at least two retaining members derived from a phenolic-graphite or a 50:50 by weight phenolic-nylon material are interbonded one to another to form a cavity wherein is positioned an ablation regression grid sensor, the improvement wherein the members are interbonded one to another with a phenolic resin adhesive.

3 Claims, 9 Drawing Figures

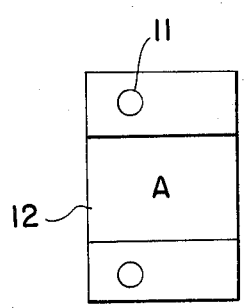 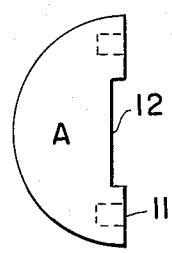 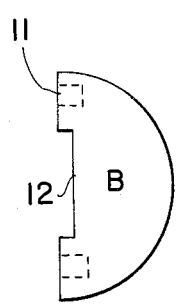 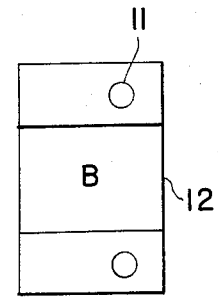
FIG. 1  FIG. 2  FIG. 3  FIG. 4
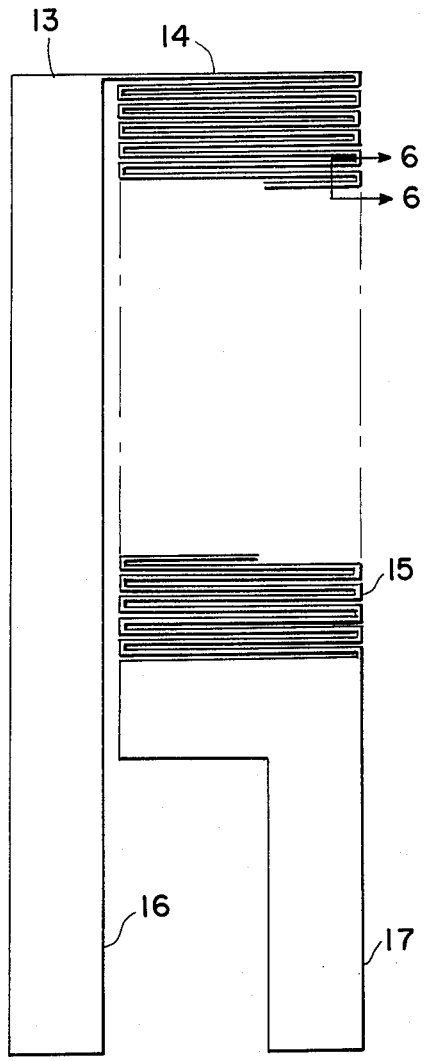
FIG. 5
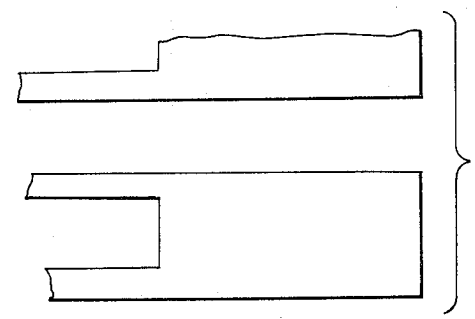
FIG. 6
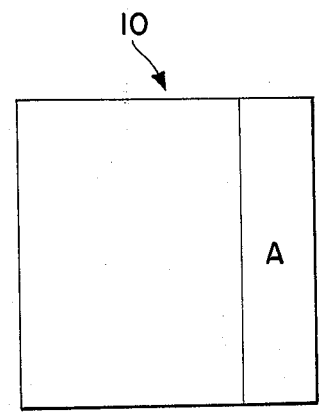
FIG. 7

BONDING METHOD IN THE MANUFACTURE OF CONTINUOUS REGRESSION RATE SENSOR DEVICES

ORIGIN OF THE INVENTION

This invention was made by employees of the National Aeronautics and Space Administration and may be manufactured and used by or for the Government of the United States for governmental purposes without the payment of any royalties thereon or therefor.

BACKGROUND OF THE INVENTION

1. Field of the Invention:

The present invention concerns an improved bonding technique in the manufacture of continuous regression rate sensor devices. More particularly, the invention concerns the use of phenolic resins as bonding agents in the manufacture of continuous regression sensor devices that are manufactured from phenolic-graphite or 50:50 by weight phenolic-nylon materials.

2. Description of the Prior Art:

One of the primary requisites for materials used in nose cones and other structural members of space missiles and the like is that they be able to withstand the extreme heat developed on re-entry into the earth's atmosphere and remain structurally sound.

Another requirement is that the internal temperature of the spacecraft does not become too high whereby scientific instruments aboard the craft are adversely affected, or if the spacecraft is a manned one, the occupants thereof are not subjected to unnecessary stresses. These requirements have been achieved by the use of various ablative materials in the manufacture of nose cones and the like, which have the ability of sacrificing their surfaces at high temperatures while protecting the lower substrate by utilizing thermal energy. Although various plastics and ceramic materials have satisfactory physical and electrical properties for use as ablative materials, the ultimate choice of any material used depends upon the velocity and angle of re-entry of the spacecraft, as well as the density and composition of the atmosphere.

Various organic resins, such as phenolic, epoxy and furane resins, reinforced with siliceous fibers or fabrics have been used in the manufacture of nose cones, which produce a dense, carbonaceous surface on the nose cone during re-entry into the earth's atmosphere. The ability of the phenolic resins to withstand very high temperatures for short periods of time is one of the major factors in their use in the manufacture of missile nose cones. While ceramics melt and metals vaporize at high temperatures, it has been found that the phenolics, as well as various other organic resins, carbonize to form a protective thermal barrier. Some of this carbonaceous char is removed gradually by a mechanical and chemical errosion at temperatures as high as 6,000°F., while at the same time a considerable amount of heat per pound of resin is absorbed.

In order to monitor the char regression rate of nose cones manufactured from various synthetic resins, continuous regression rate sensor devices have been designed comprising an ablation regression sensor, in the form of a grid consisting of a series of thin interconnected metallic membranes of a known electrical resistance, sandwiched and bonded between two or more retaining members. The retaining members of the device are prepared from various synthetic resins, generally the same resin used in manufacturing the nose cone. The sensor devices are then bonded into pre-machined holes in the nose cone of a model. A sequence of stages of solid rocket propulsion are used to propel the missile to the desired test environment, and during the maximum velocity sequence of the flight, the nose cone and the sensor devices tend to char and ablate. As the ablation material carbonizes, the sensor device provides a means for monitoring the rate of carbonization and regression.

While sensor devices of various types have been fabricated, an important feature in their manufacture is the selection of the adhesive used. In the type of sensor device with which the present invention is concerned, the sensor device consists of at least two retaining members, that are precision-machined from a molded billet of a resin. One retaining member has a known dimensional recess machined in it, and a similar recess is usually also machined in the other retaining members whereby when the members are interbonded, there is formed a cavity in which is positioned the ablation regression sensor. In bonding these thin, electrical grid-type sensors in the cavity formed by the retaining members, it is critical that they be maintained in their requisite, precise position during the alignment of the retainer members. Consequently, if the adhesive that is used to bond the retaining members together does not have the proper viscosity, the proper positioning and alignment of the retainer members to keep the grid sensor properly aligned during fabrication presents a major problem. If the viscosity of the adhesive is too low, there is a good likelihood that the sensor grid will move during the assembly of the retaining members.

It has now been found that phenolic resins provide optimum advantages when used in interbonding the retaining members of continuous regression rate sensor devices that have been manufactured from phenolic-graphite or, 50:50 by weight phenolic-nylon materials.

SUMMARY OF THE INVENTION

The present invention provides for an improved continuous regression rate sensor device of a type having at least two retaining members derived from a phenolic-graphite or 50:50 by weight phenolic-nylon material, which are interbonded one to another to form a cavity in which is positioned an ablation regression sensor, wherein the improvement comprises interbonding the retaining members, one to another, with a phenolic resin adhesive.

It is a further object of the present invention to provide for an improved method for manufacturing continuous regression rate sensor devices, wherein retaining members derived from phenolic-graphite or 50:50 by weight phenolic-nylon materials are interbonded with a phenolic resin adhesive.

BRIEF DESCRIPTION OF THE DRAWINGS

FIGS. 1 and 4 are top plan views of retaining members A and B, respectively, of a typical continuous regression rate sensor device;

FIGS. 2 and 3 are end views of retaining members A and B, respectively;

FIG. 5 is a top plan view of the ablation regression sensor;

FIG. 6 is an expanded view of a section of the ablation rate sensor;

FIG. 7 is a top plan view of retaining member A in which is positioned the ablation rate sensor;

DETAILED DESCRIPTION OF THE INVENTION

Figure 8:
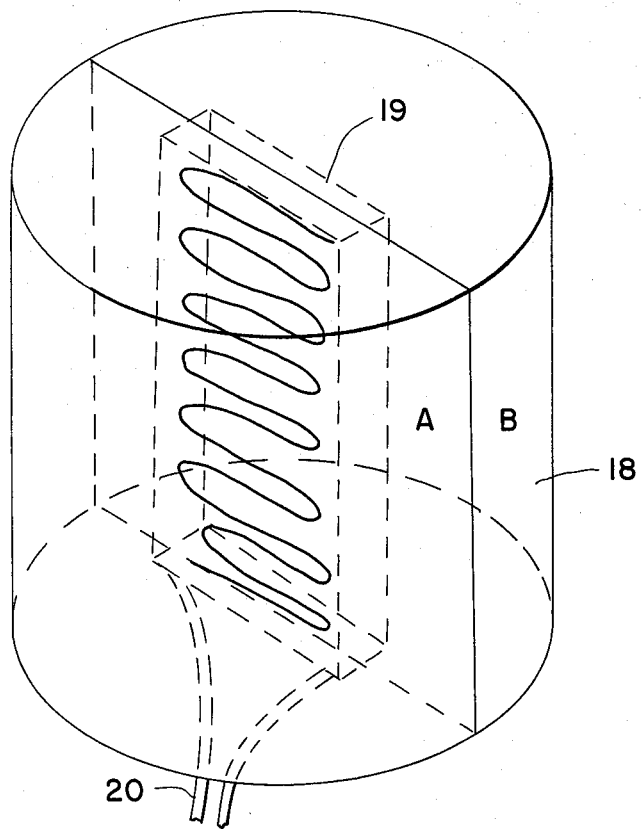
FIG. 8 is a perspective view of the assembled continuous regression sensor device showing retaining members A and B interbonded with each other and forming a cavity in which is positioned the ablation regression sensor.

The present invention provides an improved method of manufacturing continuous regression rate sensor devices, wherein the retaining members of such devices derived from phenolic-graphite or 50:50 by weight phenolic-nylon materials are interbonded one to another with a phenolic resin adhesive. It is found that the use of such resins provides a highly satisfactory and efficient method of fabricating these regression rate sensor devices and provides sensor devices capable of providing outstanding accuracy in the data obtained during high temperature arc jet environmental tests.

A typical continuous regression rate sensor device with which the present invention is concerned consists of at least two retaining members, A and B, shown in FIGS. 1–4 which are precision machined from a molded billet of either 50:50 by weight phenolic-nylon or phenolic-graphite. In the sensor device shown in the drawings, both retaining members A and B have a known dimensioned recess 12 of a size sufficient to accept and retain the electrical grid-type ablation regression sensor 10. The retaining members are also usually machine drilled as designated by reference numeral 11 for two phenolic-nylon dowels (not shown) in order to maintain proper alignment of the retaining members at the time of final assembly of the finished sensor device.

In preparing the sensor devices shown herein, the electrical grid-type ablation rate sensor is generally inserted in recess 12 of one of the retaining members A and B. It will be seen from the FIGS. that the positioning of the ablation regression sensor grid within the recess requires considerable care. A typical electrical grid ablation rate sensor is shown in FIG. 5. The sensor comprises a straight continuous membrane 13 connected at its terminal end 14 to a second membrane 15, which is sinusoidally shaped at the portion which is connected at 14. The terminal portions of the ablation regression sensor, 16 and 17, are connected to two external terminals 20 shown in FIGS. 8 and 9.

After the ablation regression sensor grid 10 is positioned in the recess of one of the retaining members, e.g., A (FIG. 7), retaining member B is then interbonded with retaining member A with a suitable adhesive, to provide the assembled continuous regression rate sensor device shown in FIG. 8. Under use, as the sensor device ablates and carbonizes, the carbonaceous char completes the electrical circuit between metallic membrane 13 and the sinusoidally shaped member 15, shown in FIG. 5.

As continuous regression of the sensor device occurs, the carbonaceous char continuously completes the circuit, of the electrical grid and as the ablation regression grid sensor device wears away its electrical resistance which is a function of its size, continuously changes and is recorded.

Figure 9:
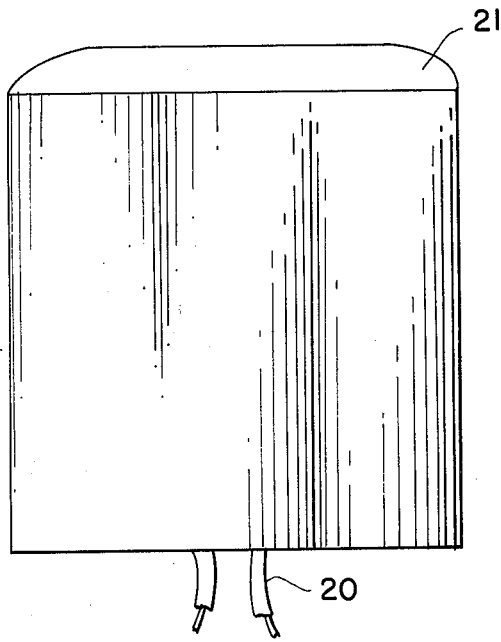
FIG. 9 is a perspective view of the continuous regression sensor device after it has been subjected to a high temperature arc jet environmental test.

In FIG. 9 there is shown the ablated end 21 of a continuous regression sensor device that has been subjected to a high temperature arc jet environmental test.

The preferred materials for preparing the retaining members A and B include phenolic-graphite and 50:50 by weight phenolic-nylon materials. As mentioned above, the positioning of the electrical grid ablation regression sensor within the recess of one of the retainer halves and the subsequent interbonding of the two halves to provide the finished continuous regression rate sensor device is critical, inasmuch as any misalignment of the ablation regression sensor grid during the manufacturing process will result in a defective sensor device.

It has now been found that a continuous regression rate sensor device manufactured from phenolic-graphite or 50:50 by weight phenolic-nylon having superior characteristics can be obtained when a phenolic resin adhesive is used as the bonding agent to join the sensor retaining members. In the past, epoxy-based adhesives, such as Dow Epoxy Novalac 438, available from the Dow Chemical Company, Midland, Mich., has been used for bonding phenolic-nylon derived continuous regression rate sensor devices, but because of the low viscosity of these epoxy adhesives in their uncured state, bonding the electrical grid-type ablation regression sensors within the sensor retaining members gave rise to many serious problems, particularly since it was difficult to maintain precise positioning of the grid during the alignment of the retainer members. Curing of these adhesives involved additional difficulties, since it is not possible to "B" stage the epoxy-based adhesives. Furthermore, with epoxy-based adhesives, there is a difference in the char and char retention characteristics at the bond line area, since the adhesive is chemically unlike the sensor retaining member material. On the other hand, since phenolic resins are chemically similar to the phenolic-nylon and phenolic-graphite materials used in the manufacture of the sensor retaining members, an indifferent char pattern is exhibited over the bond line area following high temperature arc jet environmental testing. This compatibility of the phenolic resin bonding system also permits better ablation qualities, with less adhesive spalling in the char at the bond line gap area during the arc jet environmental tests.

In preparing the continuous regression rate sensors, the surfaces of the retaining member halves are first cleaned by wiping them with a lint-free cloth that has been moistened with Freon T. F. solvent, available from the E.I. Dupont DeNemours and Company, Wilmington, Del. The surfaces of the retaining members that are not to be bonded are masked with a one inch wide masking tape, and the surfaces of the retaining members that are to be bonded are then abraded with a Metco abrasive blast gun, available from the Metco Corporation, Westbury, L.I., N.Y., using No. 120 grain size aluminum oxide as the abrasive grit and 20 p.s.i.g. air pressure. It is convenient to carry out this procedure in a Pangborn blast booth, which is available from the Pangborn Corporation, Hagerstown, Maryland. The masking tape is then removed from the retaining members, which are then wiped with Freon, T.F. solvent. Using a small artist brush, a thin continuous coating of phenolic resin, preferably that identified as 91LD, available from the American Reinforced Plastics Company, 851 East 60th. Street, Los Angeles, Calif., is applied to the abraded surfaces of the retaining members to be bonded. The phenolic resin is then dried at ambient temperature (75°±5°F) for about 30 minutes.

The retaining members are then placed in a Coates oven, available from the Coates Electric and Manufacturing Company, Seattle, Washington, at a temperature of 185°F±5°F, for 5 minutes to B stage the phenolic resin. After this treatment, the sensor grid is inserted in one of the retaining member recesses by applying a minimum amount of phenolic resin in the area of the retaining member half that is to receive the sensor grid. The phenolic resin is then allowed to set at ambient temperature (75°F±5°F) for about 30 minutes. This imparts to the phenolic resins sufficient "tackiness" to retain the grid in its proper position. The required lead wires are then attached to the sensor grid, and then a coating of phenolic resin is applied with a brush to the alignment dowels of the retaining members. The resin is then allowed to set at ambient temperature for an additional thirty minutes. The meeting retaining members are then carefully placed together in their proper positions. A strip of 1/16 inch thick silicone rubber strip, available from the Connecticut Hard Rubber Company, New Haven, Conn., is cut approximately ½ inch wide with sufficient length to go around the outside diameter of the assembled sensor device. A clamp hose is placed over the silicone rubber strip around the outside diameter of the assembled sensor device and tightened. The coefficient of thermal expansion of the rubber strip acts as the pressure medium during the elevated temperature cure cycle of the phenolic resin.

The assembled sensor device is then placed in the Coates oven and cured for one hour at a temperature of 330°F±5°F. The assembly is then removed from the oven and allowed to cool to ambient temperature prior to removing from the bonding fixture. Excess resin is removed from the bonded assembly and each lead wire is checked for continuity. The continuous regression rate sensor device is now ready for use.

In bonding the retaining members, any phenolic resin that can be B staged can be used. As mentioned above, an especially preferred phenolic resin is that designated as 91LD, which is a high heat resistant, high strength phenolic resin, available from the American Reinforced Plastics Company of Los Angles, Calif.

The retaining members are prepared from phenolic-graphite or 50:50 by weight phenolic-nylon by conventional techniques well known to those skilled in the art.

The phenolic-carbon sensor bodies were machined from compression molded, elevated temperature cured billets of Narmco 4028 compound manufactured by Narmco Materials Divison, Telecomputing Corporation, Costa Mesa, Calif. Narmco 4028 is a modified phenolic-carbon-fiber-reinforced, ablative and insulating compound containing 50% resin content. It was developed primarily for use in rocket and missle parts which are subjected to high temperatures and to the impingement of high velocity gases. Some of the more customary areas of application are aft closures, heat shields, and blast tubes.

The phenolic-nylon sensor bodies were machined from pre-weighed, mixed and molded billets of powdered nylon, Zytel 103, manufactured by E.I. Dupont DeNemours and Company, Wilmington, Del. and Powdered Phenolic Resin BRP5549, Union carbide Corporation, New York, N.Y.

The ability to B stage the phenolic resin at an elevated temperature (185°F), attach the sensor grid in position and attach the lead wires to the grid terminals prior to assembly of the retaining members for the final elevated temperature cure cycle (325°F) is an added benefit as compared to the previously used adhesives. This latter factor allows for only an insignificant minimal movement of the sensor grid in relation to the meeting sensor retaining members when the assembled device is maintained under constant pressure during the final elevated temperature cure cycle. As mentioned above, the silicon rubber clamp system functions as a pressure medium during the cure cycle, with the coefficient of thermal expansion of the silicone rubber supplying the pressure during the elevated temperature cure cycle.

When used with phenolic-graphite and phenolic-nylon derived retaining members, the phenolic resin provides a more compatible system than the previously used adhesives. This compatibility permits better ablation qualities with less adhesive spalling occurring in the char at the bond line gap area during the arc jet environmental tests of the sensor devices.

Although the invention has been described and illustrated by reference to particular embodiments thereof, it will be understood that the invention is not limited to such embodiments and that variation and substitution of obvious equivalents may be resorted to within the scope of the appended claims.

What is claimed is:

1. A method of making a continuous regression rate sensor device comprising:
    machining a first retaining member for a rate sensor grid from an ablative material selected from the molded group consisting of 50:50 by weight phenolic-nylon material and a phenolic-carbon-fiber reinforced compound having a fifty percent resin content,
    machining a second retaining member for the sensor grid from the same material as said first retaining member,
    each of said first and said second retaining members being machined so as to provide mating surfaces on at least a portion of the exterior thereof,
    each of said first and said second retaining members being further machined to provide a mating recess in the respective mating surfaces thereof of such dimension as to receive a sensor grid therein when the two retaining members are positioned with the mating surfaces thereof abutting each other,
    applying a thin coating of a liquid phenolic resin to the area of said mating surface of each said first and second retaining members that encompasses the recess therein and drying the coated surfaces at ambient temperature for approximately 30 minutes,
    heating the resin coated retaining members at a temperature of approximately 185°F. for 5 minutes to effect B staging of the phenolic resin,
    applying a thin coat of the phenolic resin adhesive to the recessed area of one of the retaining members,
    immediately positioning a sensor grid in the coated recess and permitting the phenolic resin adhesive to dry at ambient temperature to thereby acquire sufficient "tackiness" to retain the grid in position during further assembly, connecting electrical lead wires to the sensor grid of such length as to extend away from the first and second retaining members, placing said first and said second retaining members in abutting relationship with the sensor grid positioned therebetween, securing said first and said second retaining members together and heating the secured unit at a temperature of approximately 330°F. to thereby cure the phenolic resin adhesive and bond the first and second retaining members into a unitary structure containing the sensor grid with lead wires extending therefrom.

2. The method of claim 1 and including the further steps of providing at least two alinement dowels connecting said first and second retaining members and wherein each of said dowels is coated with a thin layer of phenolic resin adhesive and this adhesive layer dried at ambient temperature for approximately thirty minutes immediately prior to placing of the first and second retaining members in abutting relationship.

3. The method of claim 1 including the further step of encasing the outside diameter of the abutting first and second retaining members with a strip of silicone rubber and providing a tightened clamp hose over the rubber strip to provide further securing of the first and second retaining members in fixed relationship during the subsequent curing step.

* * * * *